July 2, 1957 E. S. SELMER 2,798,156

DIGIT PULSE COUNTER

Filed Dec. 17, 1953 2 Sheets-Sheet 1

INVENTOR.
ERNST S. SELMER
BY James B. Christie
ATTORNEY

July 2, 1957 E. S. SELMER 2,798,156

DIGIT PULSE COUNTER

Filed Dec. 17, 1953 2 Sheets-Sheet 2

INVENTOR.
ERNST S. SELMER
BY James B. Christie
ATTORNEY

United States Patent Office 2,798,156
Patented July 2, 1957

2,798,156

DIGIT PULSE COUNTER

Ernst S. Selmer, Oslo, Norway, assignor, by mesne assignments, to Burroughs Corporation, Detroit, Mich., a corporation of Michigan Application December 17, 1953, Serial No. 398,834
10 Claims. (Cl. 250—27)

This invention relates to digital computers and is primarily concerned with improvements in electronic apparatus for use in conjunction with electronic adders for performing arithmetic operations.

The fundamental operation in most digital computers is the addition of two numerals. Besides providing the sum of numbers to be added, the addition function of the computer is employed in effecting subtraction, multiplication, division, logical operations, etc., which may be combined to perform mathematical computations.

In my co-pending United States patent application entitled "Electronic Adder," Serial No. 382,401, filed September 25, 1953, I have described an electronic adder which is capable of operating at high speeds with great reliability. In order to actuate the electronic adder of my co-pending application, a source of control pulses is required from which may be derived shift pulses, complement pulses, add pulses and decimal correct pulses. To provide suitable actuating pulses for use in conjunction with my electronic adder, I have developed a source of control pulses which forms the subject matter of the present invention.

One method for introducing numerals into an electronic adder is to present each of the digits of the numeral in time sequence. Each of the digits may be separated by a digit pulse and separate numerals may be separated by space pulses. The interval between two space pulses is commonly known as a "word time," since a numeral comprising a plurality of digits is commonly known as a "word." In the electronic adder of my co-pending application, addition of two numerals, each comprising a plurality of digits, is accomplished by successively adding each of the digits in time sequence. The addition of two numerals ordinarily takes two word times, and the complete operation for adding a pair of digits comprises shifting, complemeting if necessary, adding, and decimal correcting. Accordingly, the apparatus of the present invention provides a source of control pulses which presents in time sequence to the electronic adder: shift pulses, complement pulses, add pulses, and decimal correct pulses.

In accordance with the present invention, I provide two flip-flops, i. e. bi-stable circuits, each of which is adapted to have two conditions of operation. A first sensing circuit provides an output signal when each of the flip-flops is in its second condition of operation and a digit pulse occurs. This output signal may be used to drive a pulse generator and the output signal from the pulse generator may be applied directly to the electronic adder for complementing and may be delayed by a predetermined interval of time and applied to the electronic adder for adding. The output signal from the pulse generator also is applied to one of the flip-flops to place it in its first condition of operation. A second sensing circuit then provides an output signal when one of the flip-flops is in its second condition of operation and the other of the flip-flops is in its first condition of operation. This last named output signal may be applied to a pulse generator, and the output signal from the pulse generator may be delayed by a suitable interval to provide a decimal correct pulse for application to the electronic adder. In addition, the output of the last named pulse generator may be delayed by a suitable interval and applied to the electronic adder as a shift pulse. Also, the output of the last named pulse generator may be applied to one of the flip-flops to place it in its second condition of operation. An additional or third sensing circuit is employed to provide an output signal when the second flip-flop is in its second condition of operation and a space pulse occurs. Where the number of digit pulses occurring between space pulses is an odd number, the third coincidence circuit will provide an output signal only after an interval of two word times. This last named output signal may be termed an "operation complete" signal and may be employed to return both of the flip-flops to their first condition of operation.

DESCRIPTION OF ELECTRONIC ADDER

In the electronic adder of my co-pending application, I provide two sets of four flip-flops, i. e. bi-stable circuits for providing binary registrations of the successive numerals of an augend and an addend, a flip-flop for providing a binary registration of any carry digit, and pulse-responsive gate means interconnecting one of the sets of flip-flops and the other flip-flops for altering the binary condition of the other set of four flip-flops and the carry flip-flop to represent the sum of the successive numerals of the augend and addend which are registered in the two sets of flip-flops.

Ordinarily, the set of four flip-flops whose binary condition is altered to represent the sums of the successive numerals of the augend and addend is coupled to a register, so that the successive summations are shifted into the register prior to the addition of the next two numerals.

In order to register decimal numbers in a set of four flip-flops, the flip-flops are ordinarily designated by the numbers 1, 2, 4 and 8, so that the summation of the numbers which the actuated flip-flops represent equals the decimal number registered. The following table indicates such a binary code:

*Table I*

| Decimal Number | Binary Code | | | |
|---|---|---|---|---|
| | 8 | 4 | 2 | 1 |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

Four flip-flops may be employed to register sixteen numerals in binary form since sixteen different binary conditions may be provided. In the adder, the four flip-flops whose binary condition is altered to represent the sums of the successive numerals are employed to provide a binary answer for the sums from 0 to 15, and these four flip-flops and the carry flip-flops are employed to provide a binary answer for the sums from 16 to 19. Then a decimal correction is effected to alter the binary condition of the five flip-flops for sums from 10 to 19 so that the tens digit is registered in the carry flip-flop and the units digit is registered in the other four adder flip-flops in accordance with the code of Table I. The following table indicates these binary and decimal answers:

*Table II*

| Binary Answer | | | | | Decimal No. | Decimal Answer | | | | |
|---|---|---|---|---|---|---|---|---|---|---|
| $C_1$ | $X_8$ | $X_4$ | $X_2$ | $X_1$ | | $C_1$ | $X_8$ | $X_4$ | $X_2$ | $X_1$ |
| 0 | 0 | 0 | 0 | 0 | 0 | 0 | 0 | 0 | 0 | 0 |
| 0 | 0 | 0 | 0 | 1 | 1 | 0 | 0 | 0 | 0 | 1 |
| 0 | 0 | 0 | 1 | 0 | 2 | 0 | 0 | 0 | 1 | 0 |
| 0 | 0 | 0 | 1 | 1 | 3 | 0 | 0 | 0 | 1 | 1 |
| 0 | 0 | 1 | 0 | 0 | 4 | 0 | 0 | 1 | 0 | 0 |
| 0 | 0 | 1 | 0 | 1 | 5 | 0 | 0 | 1 | 0 | 1 |
| 0 | 0 | 1 | 1 | 0 | 6 | 0 | 0 | 1 | 1 | 0 |
| 0 | 0 | 1 | 1 | 1 | 7 | 0 | 0 | 1 | 1 | 1 |
| 0 | 1 | 0 | 0 | 0 | 8 | 0 | 1 | 0 | 0 | 0 |
| 0 | 1 | 0 | 0 | 1 | 9 | 0 | 1 | 0 | 0 | 1 |
| 0 | 1 | 0 | 1 | 0 | 10 | 1 | 0 | 0 | 0 | 0 |
| 0 | 1 | 0 | 1 | 1 | 11 | 1 | 0 | 0 | 0 | 1 |
| 0 | 1 | 1 | 0 | 0 | 12 | 1 | 0 | 0 | 1 | 0 |
| 0 | 1 | 1 | 0 | 1 | 13 | 1 | 0 | 0 | 1 | 1 |
| 0 | 1 | 1 | 1 | 0 | 14 | 1 | 0 | 1 | 0 | 0 |
| 0 | 1 | 1 | 1 | 1 | 15 | 1 | 0 | 1 | 0 | 1 |
| 1 | 0 | 0 | 0 | 0 | 16 | 1 | 0 | 1 | 1 | 0 |
| 1 | 0 | 0 | 0 | 1 | 17 | 1 | 0 | 1 | 1 | 1 |
| 1 | 0 | 0 | 1 | 0 | 18 | 1 | 1 | 0 | 0 | 0 |
| 1 | 0 | 0 | 1 | 1 | 19 | 1 | 1 | 0 | 0 | 1 |

The binary answers representing the decimal numbers from 10 through 15 are designated "forbidden combinations" because the binary condition of the four flip-flops $X_1$, $X_2$, $X_4$ and $X_8$ representing these numbers is in non-decimal form. The binary answers representing the decimal numbers from 16 through 19 have the tens digit registered in the carry flip-flop $C_1$, but the binary condition of the flip-flops $X_1$, $X_2$ $X_4$ and $X_8$ must be altered in order to provide the answer in decimal form.

A binary answer is registered in the flip-flops in response to static potentials which set up gates which allow an "add" pulse to actuate selected flip-flops. The static potentials are set up in accordance with the flip-flops which are initially actuated in order to represent the numerals to be added.

A binary answer is converted to a decimal answer by static potentials which allow a "decimal correct" pulse to actuate selected flip-flops. These potentials are set up by flips-flops which register forbidden combinations or carries beyond 15 in the binary answers.

Thus, a binary answer causes the flip-flops in the adder to set up gates which permit a decimal correct pulse to alter the condition of the flip-flops to provide a decimal answer.

If it is necessary to complement either or both of the sets of four flip-flops, say in effecting subtraction or division, a complement pulse, which precedes the add pulse, is applied to gates which effect this function.

The invention is explained with reference to the drawings, in which.

Figure 1:
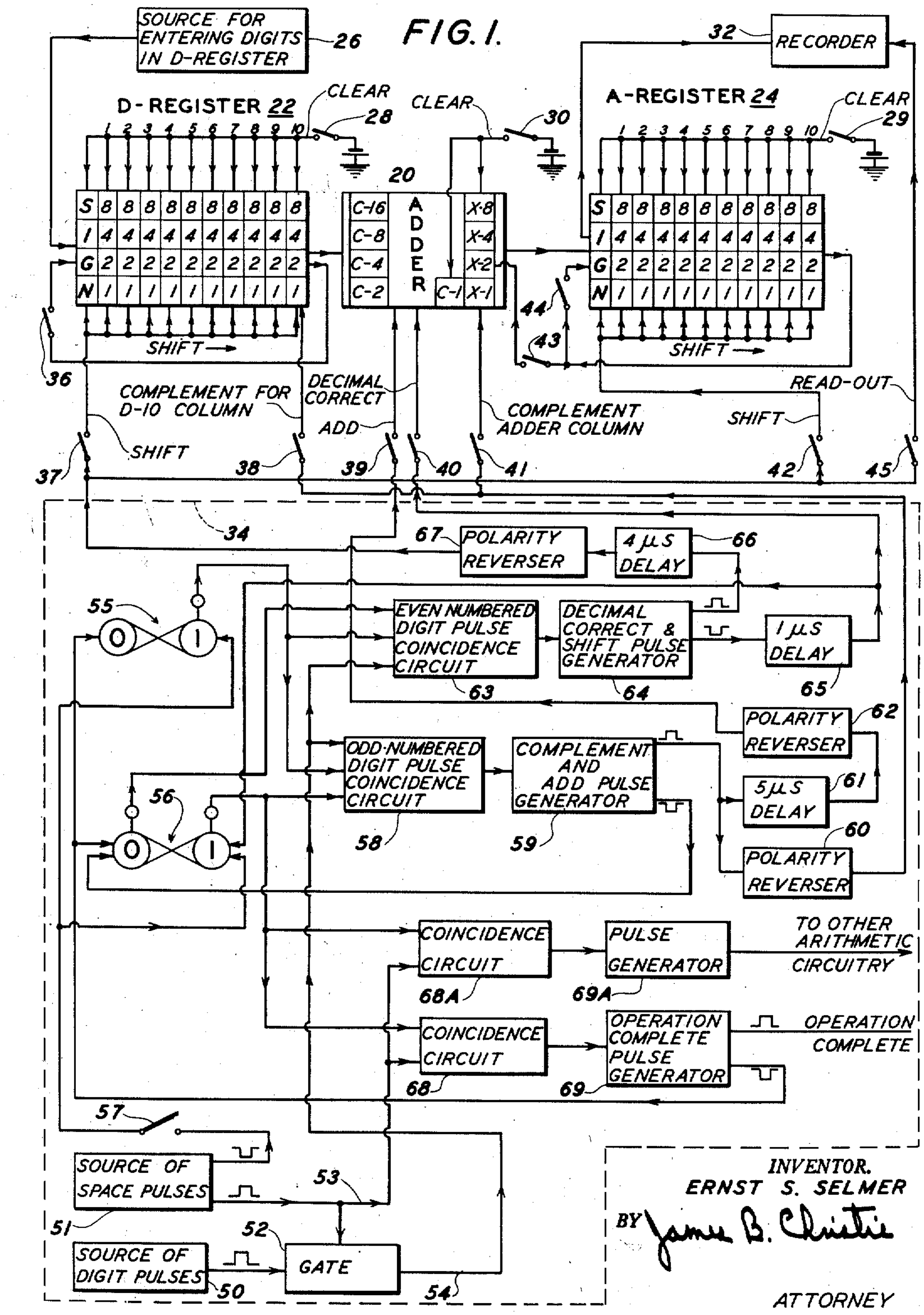
Fig. 1 is a block diagram showing how an adder and the source of control pulses may be employed in conjunction with registers to effect addition of multidigit numbers.

In the apparatus of Fig. 1, the adder 20 is connected to receive static digital information from a D-register 22 and to supply digital information to and receive digital information from an A-register 24. The registers 22 and 24 are each provided with a plurality of sets of four flip-flops, and each set of four flip-flops is arranged to register a decimal digit in accordance with the 1, 2, 4, 8 binary code shown in Table I. In the apparatus illustrated, each register is provided with eleven sets of four flip-flops, with the first set of four flip-flops designated the "Sign" column and the other sets of four flip-flops being designated columns 1 to 10. Thus, a ten digit decimal number and a plus or a minus sign may be registered in each of the registers 22 and 24 where the condition of a single one of the "Sign" set of flip-flops represents plus or minus.

Digital information is supplied to the register 22 from a source 26 which may be any conventional type adapted to actuate a set of four flip-flops in accordance with the binary code of Table I. The sign is registered in the "Sign" column by causing the "N" flip-flop to be actuated, or in the "one" state, for minus, and by causing all four of the flip-flops in the "Sign" column to be in the "zero" state for plus.

The registers 22 and 24 and the adder 20 may be cleared of all digital information by operating the switches 28, 29 and 30.

A recorder 32 is coupled to the "Sign" column of the register 24 for providing a record of the digital information which is stored in the register 24. The recorder may be a conventional type adapted to provide a record of digital information which is registered in a binary code.

The read-out arrangement of Fig. 1 is suitable for use with a recorder which records the sign first and then the most significant digit, etc. This is the usual recording sequence when an electric typewriter is employed as the recorder.

It will be apparent that some recording arrangements, say magnetic storage recorders, may be coupled to the tenth column of the register 24. With such an arrangement the least significant digit of the answer is recorded first.

Pulses for actuating the electronic adder portion of Fig. 1 are provided by a source of control pulses 34 enclosed within dashed lines. A further description of the source of control pulses 34 will be given later.

Figure 2:
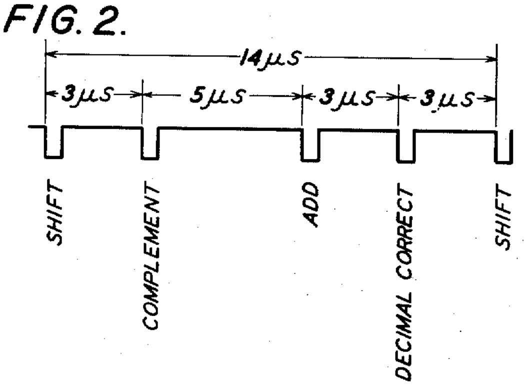
Fig. 2 is a diagram showing one suitable time sequence of pulses for actuating an adder and its associated registers.

The pulse spacing illustrated in Fig. 2 is the preferred spacing for obtaining reliable high speed operation; however, other spacing may be employed if desired.

With the pulse spacing of Fig. 2, addition of two numerals is effected in 14 microseconds.

Control switches 36 to 45 serve to connect the source 34 of control pulses to the various components of the apparatus of Fig. 1 and to connect the outputs of the registers 22 and 24 as required.

Mechanical switches are shown in Fig. 1 for convenience. However, it will be appreciated that the control switches 28 to 30 and 36 to 45 may be high speed electronic types which are controlled by electrical commands.

A set of four adder flip-flops $X_1$, $X_2$, $X_4$ and $X_8$ in the adder 20 registers the numerals which are transferred to it from the tenth column of the register 24, an additional flip-flop $C_1$ registers any carry digits, and a further set of four flip-flops $C_2$, $C_4$, $C_8$ and $C_{16}$ serves as an auxiliary carry storage unit.

The binary condition of the adder flip-flops $X_1$, $X_2$, $X_4$ and $X_8$ is altered in accordance with the information in the tenth column of the register 22 in order to effect addition. Thus, a numeral may be shifted into the adder flip-flop $X_1$, $X_2$, $X_4$ and $X_8$ from the tenth column of the register 24, and the binary condition of the adder flip-flops and the carry flip-flop $C_1$ is then altered in accordance with the information in the tenth column of the register 22 so that the condition of the adder flip-flops and the carry flip-flop $C_1$ represents the binary sum of the two numerals. The initial summation after the "add" pulse provides a binary answer which is converted 3 microseconds later to a decimal answer by a decimal correct pulse, in accordance with the chart of Table II. The successive decimal digits of the answer are shifted into the register 24.

In operation, the switch 37 is closed and one of the addends is shifted into the register 22 by causing the successive numerals to be shifted to the right until the digits of the addend are registered in the columns 1 to 10 and the sign of the addend is registered in the "Sign"

column of the register 22. This addend is transferred to the register 24 by closing the switches 37, 39, 40, 42 and 43 so that the successive numerals in the register 22 are shifted to the right and the zeros in the register 24 are shifted into the adder flip-flops $X_1$, $X_2$, $X_4$ and $X_8$. The successive numerals in the register 22 are thereby added to the zeros in the register 24 to cause the numerals to be transferred to the register 24. The switches 39, 40, 42 are then opened, the switches 36 and 37 are closed, and the numerals of the other addend are shifted into the register 22.

The two addends are added by closing the switches 37, 39, 40, 42 and 43 as before, and the answer is shifted into the register 24. The various switches are then opened so that the answer remains in the register 24. In order to provide a record of the answer, the successive numerals are recirculated in the register 24 by closing the switches 42 and 44, and the read-out switch 45 is closed to actuate the recorder 32. The individual numerals which are transferred from the tenth column to the "Sign" column of the register 24 during recirculation are sensed and recorded by the recorder 32. When printing-out the answer, the recorder 32 ordinarily operates slower than the speed at which numerals can be recirculated in the register 24. In this case the shift switch 42 is closed until ten shift pulses cause the numeral in the first column to be recirculated to the "Sign" column of the register 24, the shift switch 42 is then opened and the numeral being read-out is retained in the "Sign" column until the recorder 32 completes the recording of the numeral. Then the shift switch 42 is closed until ten shift pulses cause the next numeral to be recirculated to the "Sign" column, the switch 42 is again opened so that the numeral is retained until recording is complete, and so on until all of the numerals in the register 24 are recorded.

If subtraction is to be performed, the nines complement of the number to be subtracted is added to the other number to obtain the answer. Thus, the switch 41 is closed to effect subtraction. For other arithmetic operations it may be desirable to complement the D–10 column of the D-register 22 by closing the switch 38. These switches may be actuated electronically by suitable commands derived from apparatus under the control of the "Sign" columns of the two registers, in combination with additional control apparatus (not shown) for effecting a desired arithmetic operation.

SOURCE OF CONTROL PULSES

Turning in detail to the source of control pulses 34, a source of digit pulses 50 is adapted to provide pulses having a recurring rate equal to the digit spacing. Where information is stored in the form of digits on a rotating magnetic drum, a separate track may be provided for generating a digit pulse in synchronization with each of the stored digits. A source of space pulses 51 is adapted to provide space pulses at intervals between complete numerals each of which may comprise a plurality of digits. In the illustrative embodiment, a numeral, or "word," includes ten separate digits and sign indication. Also, a digit space is left between complete numerals or "words." Therefore, where the digit pulses are assigned consecutive numbers starting with zero, the zero designated digit pulse will coincide with a space pulse and the digit pulse designated 12 will coincide in time with a space pulse. This means that between two space pulses eleven digit pulses occur. Since it is desired to apply only the digit pulses which do not coincide in time with the space pulses to the apparatus of Fig. 1, a normally open gate 52 is connected serially with the source of digit pulses 50 and is actuated by space pulses from the source of space pulses 51. Therefore, in operation, a space pulse is provided on lead 53 from the source of space pulses 51 and this is succeeded in time by eleven digit pulses appearing on the lead 54 which are passed by the gate 52. This sequence is then repeated.

An adder flip-flop 55 and a digit pulse counting flip-flop 56, each of which may comprise a conventional bistable multivibrator, are initially actuated so as to be placed in their "1" condition of operation by applying a single space pulse from the source of space pulses 51 to each of the multivibrators by means of a switch 57. The switch 57 may comprise either a mechanical switch or an electronic switch actuated by suitable commands. This sets the flip-flop 55 in position to commence an addition operation.

The odd numbered digit pulse coincidence circuit 58 senses the condition of operation of the adder flip-flop 55 and the digit counting flip-flop 56 so as to provide an output signal when both the adder flip-flop 55 and the digit pulse counting flip-flop 56 are in their "1" condition of operation and a digit pulse occurs on the lead 54. This output signal may be applied to a complement and add pulse generator 59 which may be of a suitable construction to provide a desired pulse wave form. As shown, both positive and negative pulse outputs are available and the negative pulse output may be applied to the "0" side of the digit pulse counting flip-flop 56 so as to place the flip-flop in its "0" condition of operation.

The positive pulse output of the pulse generator 59 may be reversed in polarity by means of a suitable polarity reverser 60 and applied to the adder 20 via the switch 41 and to the D-register 22 for purposes of complementing the adder column and the D–10 column, respectively. The polarity reverser 60 also may comprise a suitable pulse generator for providing a desired pulse wave form. A delaying means 61, which in the illustrative embodiment may comprise a 5 microsecond delay line, provides a delayed pulse to a suitable polarity reverser 62 which may comprise a suitable pulse generator for deriving a desired wave form, and the output pulse from the polarity reverser 62 may be applied to the adder 21 via a switch 39 for purposes of accomplishing an addition.

An even numbered digit pulse coincidence circuit 63 is adapted to provide an output signal when the adder flip-flop 55 is in its "1" condition of operation, and digit pulse counting flip-flop 56 is in its "0" condition of operation, and a digit pulse occurs on the lead 54. Thus, an output signal is provided by the even numbered digit pulse coincidence circuit 63 for every other digit pulse appearing on the lead 54 starting with the second digit pulse occurring after the initial space pulse.

A decimal correct and shift pulse generator 64 may be connected serially with the coincidence circuit 63 to provide a desired pulse wave form. As shown, the decimal correct and shift pulse generator 64 is adapted to provide both negative and positive pulse outputs. The negative pulse output from the decimal correct and shift pulse generator 64 may be suitably delayed, as for example in the illustrative embodiment, by means of a 1 microsecond delay line 65, to provide a decimal correct pulse for application to the adder 20 via the switch 40. Also, this negative pulse may be applied to the "1" side of the digit pulse counting flip-flop 56 so as to return the flip-flop to its "1" condition of operation.

The positive pulse output of the pulse generator 64 may be suitably delayed by means of a 4 microsecond delay line 66 and inverted in polarity by means of a suitable polarity reverser 67 to provide a shift pulse which may be applied to the D-register 22, the A-register 24 and the recorder 32 via the switches 37, 42 and 45, respectively. Thus, the time sequence of actuating pulses shown in Figure 2 is established by means of the source of control pulses 34. For the purpose of a complete addition of two 10 digit numbers including sign, a total of 11 add pulses must be applied to the adder 20. Therefore, the source of control pulses 34 also includes suitable circuitry for indicating the completion of a complete addition of two 10 digit numbers and sign. For this purpose, a coincidence circuit 68 is adapted to provide an output signal when the digit pulse counting flip-flop 56 is in its "1" condition of operation and a space pulse occurs on the lead 53. This output signal may be applied to a suitable operation complete pulse generator 69 for purposes of deriving a desired pulse wave form.

The negative pulse output of the operation complete pulse generator 69 may be applied to the "0" side of both the adder flip-flop 55 and the digit pulse counting flip-flop 56 so as to place these flip-flops in their "0" condition of operation. This serves to complete the sequence of operations in the source of control pulses 34 until another space pulse is applied to the "1" side of the adder flip-flop 55 and the digit pulse counting flip-flop 56 via the switch 57.

The positive pulse output of the operation complete pulse generator 69 may be applied to any suitable circuitry for indicating that the addition operation is complete. Where a complete arithmetic operation comprises a number of separate additions, additional coincidence circuits 68A and pulse generators 69A, which are identical to the coincidence circuit 68 and the operation complete pulse generator 69, may be employed to indicate the conclusion of a complete addition so as to enable other arithmetic circuitry (not shown) to supply either an aditional space pulse via the switch 57 to initiate another addition operation or to disable the coincidence circuit 68 for an interval of time extending over a number of complete addition operations, thereby providing an operation complete pulse only when the arithmetic operation is complete.

Each of coincidence circuits 58, 63, 68, 68A may include a so-called logical "and" circuit connected in series with a suitable gating device energized by the digit pulses and space pulses appearing on leads 54 and 53, respectively. The flip-flops 55 and 56 may comprise any suitable bi-stable switching circuit, such as for example, a bi-stable multivibrator.

Figure 3:
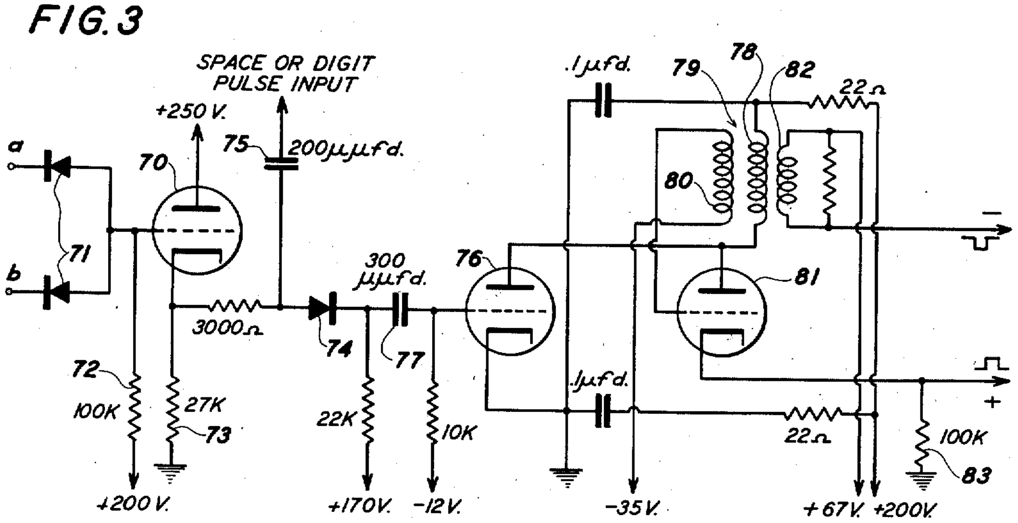
Fig. 3 is a schematic circuit diagram showing a portion of the source of control pulses.

One suitable circuit which may be used to accomplish the sensing functions of a coincidence circuit and its associated pulse generator is shown in Fig. 3.

The control electrode of an electron tube 70 may be connected to a number of input circuits via suitable unilateral conduction devices 71, such as, for example, germanium diodes. Since the control electrode of the electron tube 70 is biased positively by means of a suitable source of positive potential (not shown) and a grid resistance 72, the electron tube 70 is normally conducting and a positive potential appears across a cathode resistance 73. When any one of the input circuits is at a low potential, the conduction in the electron tube 70 is decreased and a lower positive potential appears across the cathode resistance 73. Therefore, when all of the input circuits are maintained at a high potential, the positive voltage appearing across the cathode resistance 73 is at a high level, and when any one or all of the input circuits are maintained at a low potential, the positive potential appearing across the cathode resistance 73 is decreased in value. The circuitry thus far described may be termed a logical "and" circuit, i. e., both input "*a*" and input "*b*" must be "high" to provide a high level positive potential across the cathode resistance 73.

The positive potential appearing across the cathode resistance 73 may be coupled to one side of a unilateral conduction device 74 which is used to effect gating of a signal in the presence of a positive pulse appearing via a capacitance 75 such as, for example, a space pulse or digit pulse. The positive voltage appearing across the cathode resistance 73, when taken with a positive space or digit pulse appearing via a capacitance 75, renders the unilateral conduction device 74 conducting and thereby passes a positive pulse to the control electrodes of an amplifying electron tube 76 via a coupling capacitance 77.

The control electrode of the electron tube 76 is negatively biased so as to render the electron tube 76 non-conducting until a positive pulse appears via the capacitance 77. At this time, the electron tube 76 is rendered conducting and a negative pulse appears in the anode circuit associated with the electron tube 76 from whence it is impressed across one winding 78 of a transformer 79. Another winding 80 of the transformer 79 is suitably connected to invert the negative pulse to provide a positive pulse at the control eelctrode of a pulse generating electron tube 81. This overcomes the negative bias on the control electrode and renders the electron tube 81 conducting, thereby providing a negative excursion of voltage across the winding 78 until the electron tube 81 reaches saturation. At this time, the magnetic field in the transformer 79 collapses and the negative biasing voltage is again applied to the control electrode which results in rendering the electron tube 81 non-conducting. An auxiliary winding 82 of the transformer 79 couples a pulse generated as a result of the conduction in electron tube 81 to a suitable output, as indicated in Fig. 1. In this embodiment, the winding 82 is polarized negatively so as to provide a negative pulse output from the winding 82. A positive pulse output may be obtained across the cathode resistance 83.

The voltages and circuit values indicated are given by way of example only, being indicative of those which were actually used in one successful embodiment. The values of resistances are given in ohms with $K=1000$; the voltages in volts; and the capacitances in microfarads ($\mu$fd.) and micro-micro-farads ($\mu\mu$fd.) as noted.

I claim:

1. A digit pulse counter comprising in combination; an adder flip-flop having a first condition of operation and a second condition of operation; a digit pulse counting flip-flop having a first condition of operation and a second condition of operation; a source of digit pulses; a first coincidence means coupled to said adder flip-flop, said digit pulse counting flip-flop, and said source of digit pulses for providing a first coincidence signal when coincidence is achieved between the second condition of operation of said adder flip-flop, the second condition of operation of said digit pulse counting flip-flop, and a digit pulse from said source of digit pulses; means coupling said first coincidence means to said digit pulse counting flip-flop for placing said digit pulse counting flip-flop in its first condition of operation in response to said first coincidence signal; a second coincidence means coupled to said adder flip-flop, said digit pulse counting flip-flop and said source of digit pulses for providing a second coincidence signal when coincidence is achieved between the second condition of operation of said adder flip-flop, the first condition of operation of said digit pulse counting flip-flop, and a digit pulse from said source of digit pulses; means coupling said second coincidence means to said digit pulse counting flip-flop for placing said digit pulse counting flip-flop in its second condition of operation in response to said second coincidence signal; a source of space pulses; a third coincidence means coupled to said digit pulse counting flip-flop and said source of space pulses for providing a third coincidence signal when coincidence is achieved between the second condition of operation of said digit pulse counting flip-flop and a space pulse from said source of space pulses; and means coupling said third coincidence means to said adder flip-flop and said digit pulse counting flip-flop for placing both said adder flip-flop and said digit pulse counting flip-flop in their first condition of operation in response to said third coincidence signal.

2. A source of control pulses for an electronic digital adder comprising in combination; a source of digit pulses having a given rate of repetition; a source of space pulses having a given rate of repetition which is lower than said first given rate of repetition; a gating means connected serially with said source of digit pulses; means coupling said source of space pulses to said gating means for rendering said gating means non-conducting when coincidence occurs between a space pulse from said source of space pulses and a digit pulse from said source of digit pulses; an added flip-flop having a first condition of operation and a second condition of operation; a digit pulse counting flip-flop having a first condition of operation and a second condition of operation; a first coincidence means coupled to said adder flip-flop, said digit pulse counting flip-flop and said gating means for providing a first coincidence signal when coincidence is achieved between the second condition of operation of said adder flip-flop, the second condition of operation of said pulse counting flip-flop and a digit pulse from said source of digit pulses; means coupling said first coincidence means to said digit pulse counting flip-flop for placing said digit pulse counting flip-flop in its first condition of operation in response to said first coincidence signal; a second coincidence means coupled to said adder flip-flop, said digit pulse counting flip-flop and said gating means for providing a second coincidence signal when coincidence is achieved between the second condition of operation of said adder flip-flop, the first condition of operation of said digit pulse counting flip-flop and a digit pulse from said source of digit pulses; means coupling said second coincidence means to said digit pulse counting flip-flop for placing said digit pulse counting flip-flop in its second condition of operation in response to said second coincidence signal.

3. A source of control pulses according to claim 2 including a third coincidence means coupled to said digit pulse counting flip-flop and said source of space pulses for providing a third coincidence signal when coincidence is achieved between the second condition of operation, between said digit pulse counting flip-flop and a space pulse from said source of space pulses.

4. A source of control pulses according to claim 3 including means coupling said third coincidence means to said adder flip-flop and said digit pulse counting flip-flop for placing both said adder flip-flop and said digit pulse counting flip-flop in their first condition of operation in response to said third coincidence signal.

5. A source of control pulses for use in conjunction with an electronic digital adder for providing in time sequence shift pulses, complement pulses, add pulses, and decimal correct pulses, comprising in combination; a first bi-stable circuit which is energized to provide an output signal for initiating the operation of said source of control pulses; a second bi-stable circuit having two alternate conditions of operation in response to a series of pulses recurring at a predetermined rate; a first sensing means for sensing the conditions of operation of said first bi-stable circuit and said second bi-stable circuit to provide a complement pulse when said first bi-stable circuit supplies an output signal, said second bi-stable circuit is in a first condition of operation and a pulse occurs; a second sensing means for sensing the conditions of operation of said first bi-stable circuit and said second bi-stable circuit to provide an output signal when said first bi-stable circuit supplies an output signal, said second bi-stable circuit is in a second condition of operation and a pulse occurs; means delaying said complement pulse to provide an add pulse; means delaying the output signal from said second sensing means to provide a decimal correct pulse and means delaying said output signal from said second sensing means to provide a shift pulse.

6. A source of control pulses according to claim 5, including a third sensing means for providing operation complete pulses in response to said second bi-stable means being in its first condition of operation and a pulse recurring at a predetermined rate lower than said first given predetermined rate.

7. A source of control pulses according to claim 6, including means coupling said operation complete pulse to both said first and said second bi-stable means for disabling the operation of said source of control pulse.

8. A source of control pulses for use with an electronic digital adder for providing in time sequence shift pulses, complement signals, add pulses, and decimal correct pulses, comprising in combination; a first pulse generator and a second pulse generator, means alternately energizing said pulse generators to provide a first train of output pulses from said first generator recurring at a predetermined rate and a second train of output pulses from said second pulse generator interspersed in time with respect to said first train of output pulses and having the same rate of recurrence; means delaying said first train of output pulses to provide add pulses, means delaying said second train of output pulses by a predetermined delay time to provide decimal correct pulses and means delaying said second train of output pulses for a time interval greater than said predetermined time interval to provide shift pulses.

9. A source of control pulses according to claim 8, including an operation complete pulse generator and means coupling said pulse generator energizing means to said operation complete pulse generator whereby an operation complete pulse is provided after a predetermined number of alternate energizations of said first pulse generator and said second pulse generator.

10. A source of control pulses according to claim 9, including means coupling said operation complete pulse generator to said pulse generator energizing means for disabling said pulse generator energizing means in response to said operation complete pulse.

References Cited in the file of this patent

Proceedings of the I. R. E., December 1950, pp. 1422–1427, "A Digital Electronic Correlator."

Electronic Engineering, December 1950, pp. 492–498, "An Electronic Digital Computor."

UNITED STATES PATENT OFFICE

CERTIFICATE OF CORRECTION

Patent No. 2,798,156 July 2, 1957

Ernst S. Selmer

It is hereby certified that error appears in the printed specification of the above numbered patent requiring correction and that the said Letters Patent should read as corrected below.

Column 8, line 10, for "eelctrode" read -- electrode --; column 9, line 5, for "added" read -- adder --.

Signed and sealed this 20th day of August 1957.

(SEAL)
Attest:

KARL H. AXLINE

Attesting Officer

ROBERT C. WATSON
Commissioner of Patents